US007643848B2

(12) United States Patent
Robinett

(10) Patent No.: US 7,643,848 B2
(45) Date of Patent: Jan. 5, 2010

(54) MULTI-ANTENNA TRANSCEIVER SYSTEM

(75) Inventor: Robert Lloyd Robinett, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 171 days.

(21) Appl. No.: 10/823,344

(22) Filed: Apr. 13, 2004

(65) Prior Publication Data

US 2005/0227631 A1  Oct. 13, 2005

(51) Int. Cl.
*H04M 1/00* (2006.01)
(52) U.S. Cl. ............... 455/552.1; 455/550.1; 455/553.1; 455/78; 455/82; 455/83; 455/103; 455/132; 455/133; 455/161.1; 455/161.3; 455/164.1; 455/164.2; 455/168.1
(58) Field of Classification Search .............. 455/550.1, 455/552.1, 553.1, 90.1–2, 78, 82–83, 102–103, 455/132–133, 136, 139, 161.1–3, 164.1–2, 455/168.1, 182.1–2, 183.1–2
See application file for complete search history.

(56) References Cited

U.S. PATENT DOCUMENTS

| | | | |
|---|---|---|---|
| 6,694,150 B1 * | 2/2004 | Standke et al. | 455/552.1 |
| 6,826,400 B1 * | 11/2004 | Cashman et al. | 455/434 |
| 6,892,076 B2 * | 5/2005 | Maalismaa et al. | 455/552.1 |
| 6,985,712 B2 * | 1/2006 | Yamakawa et al. | 455/333 |
| 7,010,335 B2 * | 3/2006 | Peek | 455/575.7 |
| 2002/0049075 A1 | 4/2002 | Takagi | 455/553 |
| 2003/0017833 A1 * | 1/2003 | Forrester | 455/456 |
| 2003/0181192 A1 | 9/2003 | Park et al. | 455/335 |
| 2003/0193923 A1 | 10/2003 | Abdelgany et al. | 370/342 |
| 2004/0005913 A1 | 1/2004 | Bollenbeck | 455/562.1 |

FOREIGN PATENT DOCUMENTS

| | | |
|---|---|---|
| EP | 1083673 | 3/2001 |
| WO | 03073661 | 9/2003 |

\* cited by examiner

*Primary Examiner*—Tuan A Tran
(74) *Attorney, Agent, or Firm*—Timothy F. Loomis; Ramin Mobarhan

(57) ABSTRACT

A transceiver system includes a first section coupled to a first antenna, a second section coupled to a second antenna, and a radio frequency (RF) unit. The first section includes a transmit path and a first receive path for a first (e.g., GSM) wireless system, a transmit path and a first receive path for a second (e.g., CDMA) wireless system, and a transmit/receive (T/R) switch that couples the signal paths to the first antenna. The second section includes a second receive path for the first wireless system and a second receive path for the second wireless system. The first and second receive paths for the first wireless system are for two frequency bands. The first and second receive paths for the second wireless system are for a single frequency band and provide receive diversity. The transceiver system may include a GPS receive path coupled to a third antenna.

28 Claims, 7 Drawing Sheets

MULTI-ANTENNA TRANSCEIVER SYSTEM

BACKGROUND

I. Field

The present invention relates generally to electronics, and more specifically to a transmitter/receiver (transceiver) system suitable for a wireless device.

II. Background

Wireless communication systems are widely deployed to provide various communication services such as voice, data, and so on. These wireless systems may be based on Code Division Multiple Access (CDMA), Time Division Multiple Access (TDMA), Frequency Division Multiple Access (FDMA), or some other multiple-access techniques. A wireless system may implement one or more standards adopted by a consortium known as 3GPP2, such as IS-2000, IS-856, IS-95, and so on. A wireless system may also implement one or more standards adopted by a consortium known as 3GPP, such as Global System for Mobile Communications (GSM), Wideband-CDMA (W-CDMA), and so on. IS-2000 and W-CDMA are third generation standards for CDMA. IS-95 and GSM are second generation standards for CDMA and TDMA, respectively. These standards are well known in the art.

A wireless communication device (e.g., a cellular phone) utilizes a transceiver system to obtain two-way communication with a wireless system. The transceiver system includes a transmitter for data transmission and a receiver for data reception. On a transmit path, the transmitter modulates a radio frequency (RF) carrier signal with data to be sent to generate an RF modulated signal that is more suitable for transmission. The transmitter further conditions the RF modulated signal to generate an RF uplink signal and then transmits the RF uplink signal via a wireless channel to one or more base stations in the wireless system. On a receive path, the receiver receives one or more RF downlink signals from one or more base stations, and conditions and processes the received signal to obtain data sent by the base station(s).

A wireless system may operate on one or more frequency bands, and a transceiver may have a transmit signal path and a receive signal path for each frequency band used by the wireless system. The transceiver may thus have many signal paths if multiple frequency bands are used by the wireless system. The wireless system may be a time division duplex (TDD) system, such as a GSM system, that transmits and receives in different time intervals. In this case, a transmit/receive (T/R) switch may be used to couple one of the signal paths, at any given moment, to an antenna at the wireless device. The T/R switch has one common RF port for the antenna (which corresponds to a single pole on the switch) and one input/output (I/O) RF port for each signal path (which corresponds to a throw on the switch). For example, a single-pole four-throw (SP4T) T/R switch may be used in a dual-band GSM transceiver having two transmit paths and two receive paths. As the number of signal paths increases to support more frequency bands, more I/O RF ports are needed for the T/R switch. The design of the T/R switch becomes more complex and performance degrades as the number of I/O RF ports increases.

A multi-mode wireless device (e.g., a dual-mode cellular phone) may be capable of communicating with multiple wireless systems (e.g., GSM and CDMA systems). This capability allows the multi-mode device to receive communication services from more systems and enjoy greater coverage provided by these systems. A multi-mode transceiver may have many signal paths to support all of the frequency bands used by all of the wireless systems. Interconnecting all of these signal paths to the antenna may require a complicated T/R switch with many I/O RF ports.

There is therefore a need in the art for a transceiver system capable of supporting multiple frequency bands for multiple wireless systems and having reduced complexity.

SUMMARY

A multi-antenna transceiver system that efficiently supports multiple frequency bands for multiple wireless systems is described herein. The transceiver system includes a number of signal paths, with each signal path being a transmit path or a receive path. The specific number of signal paths is dependent on various factors such as, for example, the number of wireless systems supported by the transceiver system, the number of frequency bands for each wireless system, whether receive (RX) diversity is applicable for each wireless system, whether signal paths for multiple frequency bands may be combined, whether signal paths for multiple wireless systems may be combined, and so on.

The transceiver system employs at least two antennas and utilizes a transceiver architecture that (1) splits up receive paths for each "non-diversity" wireless system among the antennas to reduce complexity and (2) implements main and diversity receive paths on two antennas for each "diversity" wireless system to improve performance. A non-diversity wireless system is a wireless system in which RX diversity is not applicable, e.g., a TDMA system such as a GSM system. A diversity wireless system is a wireless system in which RX diversity is applicable, such as a CDMA system. The transmit paths for all wireless systems may be coupled to one antenna. The receive paths for all wireless systems may be distributed among multiple antennas. The multiple antennas are designed with sufficient isolation to avoid damage to receiver circuitry on one antenna due to high output power from the transmit paths on another antenna. By distributing the receive paths among multiple antennas, if appropriate, complexity is reduced and a simpler T/R switch may be used for the transceiver system.

In an embodiment, the transceiver system includes first and second sections and a radio frequency (RF) unit. For this embodiment, the transceiver system supports two frequency bands for a first (e.g., GSM) wireless system and a single frequency band with RX diversity for a second (e.g., CDMA) wireless system. The first section couples to a first (main) antenna and includes (1) a transmit path and a first receive path for the first wireless system and (2) a transmit path and a first receive path for the second wireless system. The second section couples to a second (diversity) antenna and includes (1) a second receive path for the first wireless system and (2) a second receive path for the second wireless system. The first and second receive paths for the first wireless system are for two frequency bands. The first and second receive paths for the second wireless system are for a single frequency band and provide RX diversity. For this embodiment, the first section further includes a duplexer and a single-pole three-throw (SP3T) T/R switch. The duplexer couples to the transmit path and the first receive path for the second wireless system. The T/R switch couples, at any given moment, the transmit path for the first wireless system, the first receive path for the first wireless system, or the duplexer to the first antenna. The RF unit performs modulation and frequency upconversion for the transmit paths and demodulation and frequency downconversion for the receive paths. The transceiver system may include a third section coupled to a third antenna and including a receive path for Global Positioning System (GPS).

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
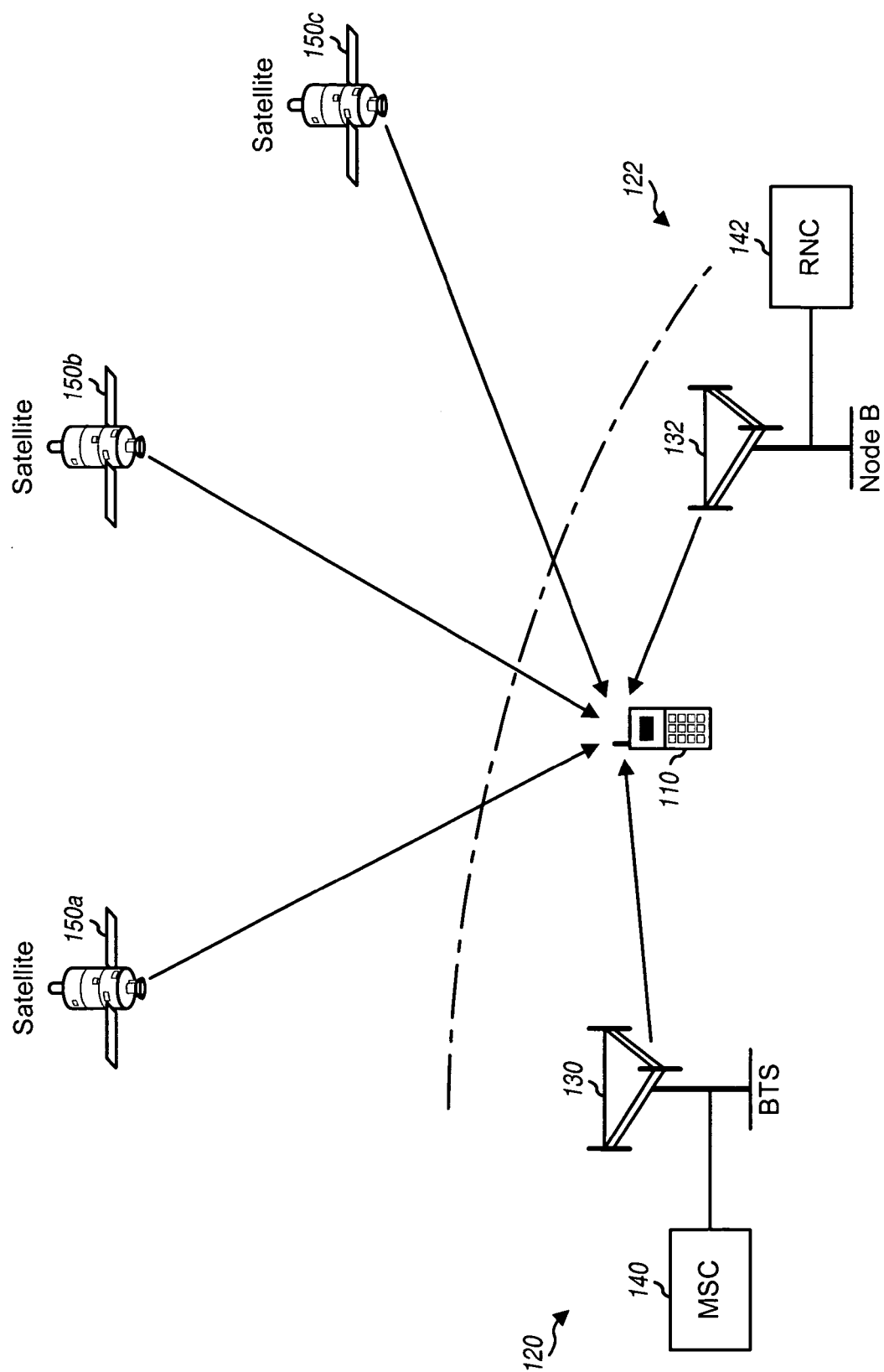
FIG. 1 shows a multi-antenna wireless device capable of communicating with multiple wireless communication systems.

FIG. 1 shows a multi-antenna wireless device 110 capable of communicating with multiple wireless communication systems 120 and 122. Wireless system 120 may be a CDMA system that may implement one or more CDMA standards such as, e.g., IS-2000 (which is commonly referred to as CDMA 1x), IS-856 (which is commonly referred to as CDMA 1x EV-DO), IS-95, W-CDMA, and so on. Wireless system 120 includes a base transceiver system (BTS) 130 and a mobile switching center (MSC) 140. BTS 130 provides over-the-air communication for wireless devices under its coverage area. MSC 140 couples to BTSs in wireless system 120 and provides coordination and control for these BTSs. Wireless system 122 may be a TDMA system that may implement one or more TDMA standards such as, e.g., GSM. Wireless system 122 includes a Node B 132 and a radio network controller (RNC) 142. Node B 132 provides over-the-air communication for wireless devices under its coverage area. RNC 142 couples to Node Bs in wireless system 122 and provides coordination and control for these Node Bs. In general, BTS 130 and Node B 132 are fixed stations that provide communication coverage for wireless devices and may also be referred to as base stations or some other terminology. MSC 140 and RNC 142 are network entities that provide coordination and control for the base stations and may also be referred to by some other terminology.

Wireless device 110 may be a cellular phone, a personal digital assistant (PDA), a wireless-enabled computer, or some other wireless communication unit or device. Wireless device 110 may also be referred to as a mobile station (3GPP2 terminology), a user equipment (UE) (3GPP terminology), an access terminal, or some other terminology. Wireless device 110 is equipped with multiple antennas, e.g., one external antenna and one or more internal antennas. The multiple antennas may be used to provide diversity against deleterious path effects such as fading, multipath, interference, and so on. An RF modulated signal transmitted from an antenna at a transmitting entity may reach the multiple antennas at wireless device 110 via line-of-sight paths and/or reflected paths. At least one propagation path typically exists between the transmit antenna and each receive antenna at wireless device 110. If the propagation paths for different receive antennas are independent, which is generally true to at least an extent, then diversity increases and the received signal quality improves when multiple antennas are used to receive the RF modulated signal.

Wireless device 110 may or may not be capable of receiving signals from satellites 150. Satellites 150 may belong to a satellite positioning system such as the well-known Global Positioning System (GPS), the European Galileo system, or some other systems. Each GPS satellite transmits a GPS signal encoded with information that allows a GPS receiver on Earth to measure the time of arrival (TOA) of the GPS signal. Measurements for a sufficient number of GPS satellites may be used to obtain an accurate three-dimensional position estimate for the GPS receiver.

In general, multi-antenna wireless device 110 may be capable of communicating with any number of wireless systems of different wireless technologies (e.g., CDMA, GSM, GPS, and so on). For clarity, the following description is for a multi-mode wireless device capable of communicating with a CDMA system and a GSM system. Wireless device 110 may receive signals from zero, one, or multiple transmitting entities at any given moment, where a transmitting entity may be a base station or a satellite. For multi-antenna wireless device 110, the signal from each transmitting entity is received by each of the multiple antennas at the wireless device, albeit at different amplitudes and/or phases.

Wireless systems 120 and 122 may operate on various frequency bands. Table 1 lists the commonly used frequency bands as well as the GPS frequency band. For each frequency band shown in Table 1, except for the GPS frequency band, one frequency range is used for the downlink (i.e., forward link) from the base stations to the wireless devices, and another frequency range is used for the uplink (i.e., reverse link) from the wireless devices to the base stations. As an example, for the GSM850/cellular band, the 824 to 849 MHz range is used for the uplink, and the 869 to 894 MHz range is used for the downlink.

TABLE 1

| Frequency Band | Frequency Range |
| --- | --- |
| International Mobile Telecommunications-2000 (IMT-2000) | 1920 to 2170 MHz |
| GSM1900/Personal Communication System (PCS) | 1850 to 1990 MHz |
| GSM1800/Digital Cellular System (DCS) | 1710 to 1880 MHz |
| GSM900 | 890 to 960 MHz |
| GSM850/Cellular | 824 to 894 MHz |
| KPCS | 1750 to 1870 MHz |
| JCDMA | 832 to 925 MHz |
| CDMA450 | 411 to 493 MHz |
| GPS | 1574.4 to 1576.4 MHz |

Wireless systems 120 and 122 may operate on other frequency bands not listed in Table 1.

Wireless device 110 may be designed to support one or multiple frequency bands for each of wireless systems 120 and 122. Wireless device 110 typically communicates with one wireless system at a time, and on one of the supported frequency band(s) for that wireless system. Various embodiments of wireless device 110 are described below.

Figure 2:
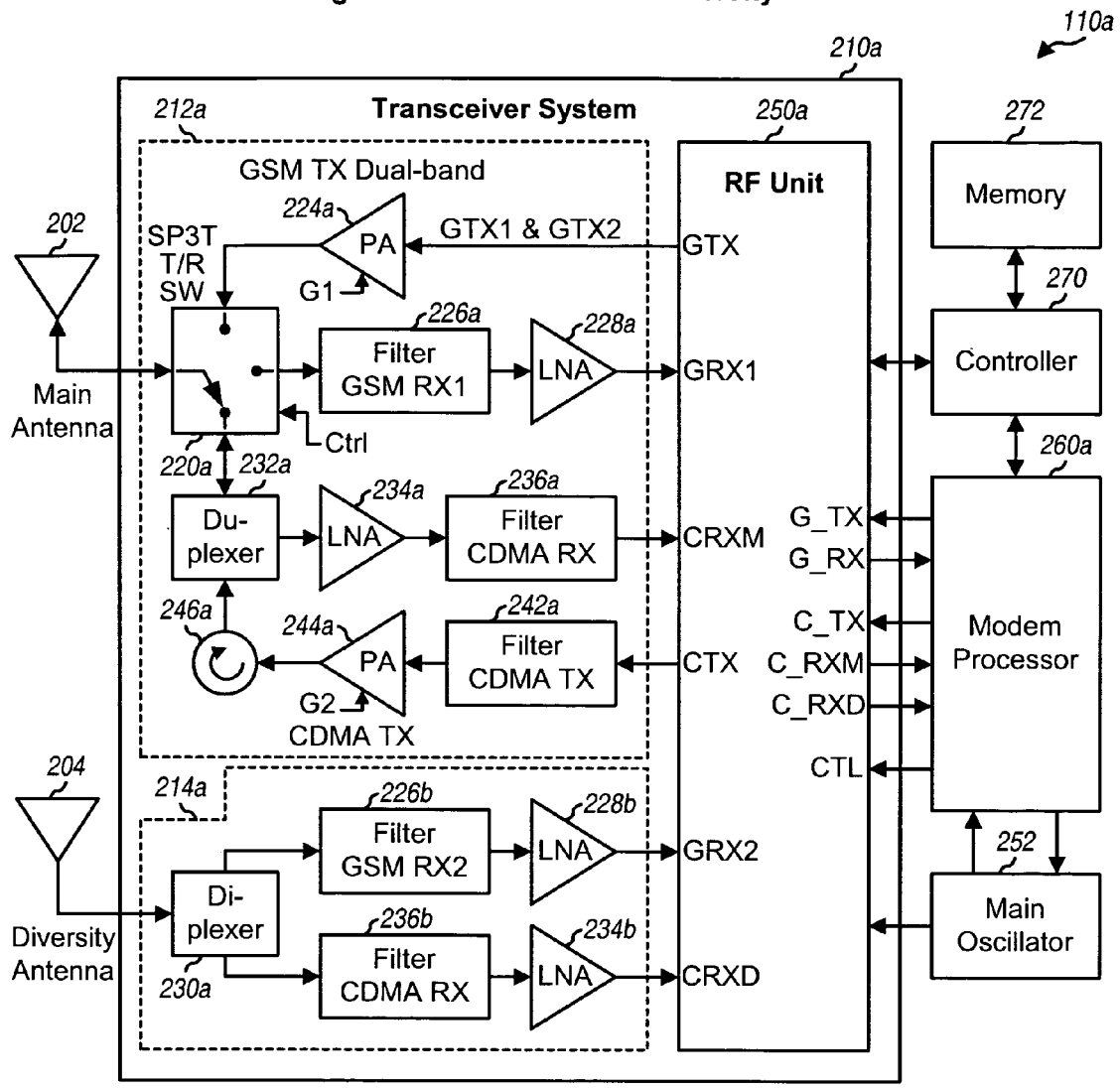
FIG. 2 shows a dual-antenna wireless device that supports two frequency bands for GSM and a single frequency band with RX diversity for CDMA.

FIG. 2 shows a block diagram of a dual-antenna wireless device 110a, which is one embodiment of wireless device 110. Wireless device 110a includes a transceiver system 210a that supports a single frequency band with RX diversity for CDMA and two frequency bands for GSM. The single CDMA band may be, e.g., PCS or cellular. The two GSM bands may be, e.g., GSM1800 and GSM900 (which are commonly used in Europe) or GSM1900 and GSM850 (which are commonly used in the United States). The single CDMA band includes a CDMA transmit band (CDMA TX) and a CDMA receive band (CDMA RX). The dual GSM bands include first and second GSM transmit bands (GSM TX1 and TX2) and first and second GSM receive bands (GSM RX1 and RX2). The dual GSM band design allows wireless device 110a to communicate with more GSM systems and enhances roaming capability.

Transceiver system 210a includes a first section 212a that couples to a main antenna 202 (which may be an external antenna), a second section 214a that couples to a diversity antenna 204 (which may be an internal antenna), and an RF unit 250a that couples to the first and second sections. First section 212a includes a single GSM transmit path for both GSM bands, a first GSM receive path for the first GSM band, and a transmit path and a main receive path for CDMA. Second section 214a includes a second GSM receive path for the second GSM band and a diversity receive path for CDMA. RF unit 250a conditions signals for sections 212a and 214a.

Within first section 212a, a single-pole three-throw (SP3T) T/R switch 220a has one common RF port (for the single-pole) coupled to main antenna 202 and three I/O RF ports (for the three throws) coupled to the GSM transmit path, the first GSM receive path, and a duplexer 232a for the CDMA transmit/main receive paths. The RF port for the GSM transmit path is an input RF port, and the RF port for the CDMA transmit/receive paths is a bidirectional RF port. T/R switch 220a couples the common RF port to one of the three I/O RF ports at any given moment based on a control signal (Ctrl), which may be a single-bit or multi-bit signal. For GSM, which is a TDD system, uplink and downlink transmissions occur in different non-overlapping time intervals (or time slots), and only the transmit path or the receive path is active at any given moment. For CDMA, uplink and downlink transmissions may occur simultaneously, and the transmit and receive paths may both be active at the same time. T/R switch 220a performs switching to allow first section 212a to process either GSM or CDMA. T/R switch 220a further performs switching between the GSM transmit and receive paths when first section 212a is processing GSM. T/R switch 220a also protects the GSM receiver circuitry from high-power transmit bursts generated by the GSM transmit circuitry.

The GSM transmit path includes a power amplifier (PA) module 224a that receives and amplifies a GSM transmit signal (GTX) from RF unit 250a and provides a GSM uplink signal for transmission via main antenna 202. The GSM transmit signal is for one of the two GSM bands supported by wireless device 110a. PA module 224a typically has a built-in or an external output power control loop (with RF output level detection and feedback circuitry), which adjusts the output power level for frequency and temperature during GSM transmit bursts. (Each GSM transmit burst has a duration of 577 μsec.) PA module 224a also has a variable gain that may be adjusted based on a gain control signal (G1), which may come from a modem processor 260a. The G1 gain control signal may ramp-up or ramp-down the gain of PA module 224a. The amplitude of the GSM uplink signal may also be controlled by the G1 gain control signal and the phase of the GSM uplink signal may be controlled by modem processor 260a to achieve any modulation (e.g., GMSK, M-PSK, OQPSK, M-QAM, and so on). T/R switch 220a typically has a built-in filter (e.g., a lowpass filter) to filter out and prevent transmission of harmonics in the GSM uplink signal generated by PA module 224a. The GSM transmit and receive paths may be designed to be compliant with GSM system requirements described in 3GPP TS 51.010, which is publicly available.

The first GSM receive path includes (1) a filter 226a that filters a received signal from main antenna 202 and (2) a low noise amplifier (LNA) 228a that amplifies the filtered signal from filter 226a and provides a first GSM received signal (GRX1) to RF unit 250a. Filter 226a may be a bandpass filter that is implemented with a surface acoustic wave (SAW) filter having a bandwidth equal to the first GSM receive band (GSM RX1). Filter 226a filters out large amplitude undesired signals (or "jammers") and other out-of-band signals transmitted by other wireless systems.

The CDMA transmit path includes a filter 242a, a power amplifier 244a, and an isolator 246a. Filter 242a filters a CDMA transmit signal (CTX) from RF unit 250a and provides a filtered CDMA signal. Filter 242a may be implemented with a SAW filter having a bandwidth equal to the CDMA transmit band (CDMA TX). Since the CDMA transmit band is lower than the CDMA receive band, filter 242a may also be implemented with a lowpass filter instead of a bandpass filter. Power amplifier 244a amplifies the filtered CDMA signal and provides a CDMA uplink signal. Isolator 246a couples the CDMA uplink signal to duplexer 232a, prevents the signal from the duplexer from coming back to power amplifier 244a, and provides an impedance load for the power amplifier. Duplexer 232a routes the CDMA uplink signal from isolator 246a to T/R switch 220a for transmission via main antenna 202.

Duplexer 232a also receives, via T/R switch 220a, the received signal from main antenna 202 and routes the received signal to the main CDMA receive path. Duplexer 232a provides isolation between the transmit path and the main receive path for CDMA, filters out undesired signal components for each of these two paths, and supports simultaneous operation of these two signal paths for full-duplex communication. (A duplexer is not needed for GSM since the transmit and receive paths are not active at the same time.) The main CDMA receive path includes a low noise amplifier (LNA) 234a and a filter 236a. LNA 234a amplifies the received signal from main antenna 202 and provides an amplified received signal. Filter 236a filters the amplified received signal and provides a main CDMA received signal (CRXM) to RF unit 250a. Filter 236a may be implemented with a SAW filter having a bandwidth equal to the CDMA receive band (CDMA RX). Duplexer 232a performs filtering to preselect the CDMA receive band and filter 236a provides additional filtering to remove leakage of the CDMA uplink signal coming from the CDMA transmit path.

Within second section 214a, a diplexer 230a couples to diversity antenna 204, the second GSM receive path, and the diversity CDMA receive path. Diplexer 230a is a frequency selective unit that splits the received signal from diversity antenna 204 into two output signals containing signal components in two frequency bands. Diplexer 230a provides (1)

a first diplexer output signal containing GSM signal components to the second GSM receive path and (2) a second diplexer output signal containing CDMA signal components to the diversity CDMA receive path. Other frequency selective units may also be used in place of diplexer 230a. Diplexer 230a may also be implemented with a single-pole two-throw (SP2T) switch, a signal splitter that does not perform filtering, or some other unit. The second GSM receive path includes (1) a filter 226b that filters the first diplexer output signal for the second GSM receive band (GSM RX2) and (2) an LNA 228b that amplifies the filtered signal from filter 226b and provides a second GSM received signal (GRX2) to RF unit 250a. The diversity CDMA receive path includes (1) a filter 236b that filters the second diplexer output signal for the CDMA receive band (CDMA RX) and (2) an LNA 234b that amplifies the filtered signal from filter 236b and provides a diversity CDMA received signal (CRXD) to RF unit 250a. Filters 226b and 236b perform filtering to preselect the second GSM receive band and the CDMA receive band, respectively.

RF unit 250a performs signal conditioning for GSM and CDMA signals for all of the transmit and receive paths. For each GSM received signal and each CDMA received signal, RF unit 250a may perform frequency downconversion, demodulation, filtering, amplification and gain control, and so on. For each GSM transmit signal and each CDMA transmit signal, RF unit 250a may perform filtering, amplification and gain control, modulation, frequency upconversion, and so on. RF unit 250a may utilize a super-heterodyne architecture or a direct-conversion architecture. The super-heterodyne architecture uses multiple stages, e.g., frequency downconversion from RF to an intermediate frequency (IF) in one stage, and (e.g., quadrature) demodulation from IF to baseband in another stage. The direct-conversion architecture uses a single stage to perform demodulation and frequency downconversion from RF directly to baseband. Similarly, modulation and frequency upconversion are performed in multiple stages for the super-heterodyne architecture and in a single stage for the direct-conversion architecture. RF unit 250a also performs modulation and demodulation for each wireless system based on the modulation scheme employed by that system and using techniques known in the art. For example, modulation for GSM may be performed with an offset phase locked loop (OPLL) or a polar modulation scheme.

Exemplary designs for a receive path and a transmit path within RF unit 250a are described below in FIGS. 7A and 7B, respectively. RF unit 250a may also include various circuit blocks in sections 212a and 214a. For example, LNA 228a, 228b, and 234b may be implemented within RF unit 250a. RF unit 250a may be implemented with one or more RF integrated circuits (RFICs), discrete components, and so on.

A modulator/demodulator (modem) processor 260a performs baseband modem processing for GSM and CDMA. For each transmit path, modem processor 260a encodes, interleaves, and modulates data to obtain data symbols, which are modulation symbols for data. Modem processor 260a further performs physical layer processing on the data symbols and pilot symbols, which are modulation symbols for a pilot, in accordance with the wireless system. For example, modem processor 260a may channelize (or "cover") and spectrally spread (or scramble) the data and pilot symbols to obtain data chips. For each receive path, modem processor 260a performs the complementary physical layer processing (e.g., spectral despreading and dechannelization) to obtain received symbols, and further demodulates, deinterleaves, and decodes the received symbols to obtain decoded data. The modem processing for GSM is described in 3GPP TS 05 documents, and the modem processing for CDMA is dependent on the CDMA standard being implemented. Modem processor 260a also performs analog-to-digital conversion for each receive path and digital-to-analog conversion for each transmit path. Although not shown in FIG. 2, modem processor 260a may also interface with a memory unit 272, multimedia units (e.g., a camera), input/output (I/O) units (e.g., a touch screen, a display unit, a keypad, a speaker, and a microphone), and so on. Modem processor 260a may be implemented with one or more application specific integrated circuits (ASICs).

A main oscillator 252 provides a reference oscillator signal (at a predetermined frequency) to RF unit 250a and modem processor 260a. Main oscillator 252 may be implemented with a voltage-controlled temperature-compensated crystal oscillator (VCTCXO) or some other types of oscillator known in the art. RF unit 250a may include built-in voltage-controlled oscillators (VCOs) and phase locked loops (PLLs). One set of VCO and PLL may be used for each signal path that may be "tuned" (i.e., adjusted in frequency) independently. Each set of VCO and PLL receives the reference oscillator signal from main oscillator 252 and generates a local oscillator (LO) signal at the desired frequency.

A controller 270 controls the operation of modem processor 260a and possibly RF unit 250a. Memory 272 provides storage for controller 270 and modem processor 260a.

The two GSM receive paths are designed to have sufficient isolation from the GSM transmit path. The peak output power for a GSM transmit burst typically ranges from +32 dBm to +35 dBm. Filters 226a and 226b are typically SAW filters having damage levels between +13 dBm and +17 dBm. An isolation of at least 22 decibel (dB) (which is +35 dBm peak output power minus +13 dBm minimum damage level) between the main antenna and the diversity antenna can ensure no damage to the GSM SAW filter 226b coupled to the diversity antenna by the GSM transmit bursts from the main antenna. This 22 dB of isolation may come from a combination of path loss between the two antennas, isolation due to directivity of the main antenna, and isolation due to directivity of the diversity antenna.

For CDMA, two receive paths coupled to two separate antennas are used to provide RX diversity and ameliorate the deleterious effects of fading, multipath, and so on. Improved performance may be achieved for RX diversity if the two antennas have some spatial diversity (or antenna separation) so that a less severe fade occurs at the diversity antenna whenever a deep fade occurs at the main antenna. A fade may be caused by two signal instances with opposite phases (due to different path delays) canceling one another (or adding destructively) at an antenna. It has been shown that RX diversity is effective even when the two antennas are separated by a small distance, e.g., a few centimeters.

The main CDMA receive path is typically designed to meet all applicable CDMA system requirements, e.g., for sensitivity and linearity. The system requirements for IS-2000 and IS-95 are described in IS-98, and the system requirements for W-CDMA are described in 3GPP TS 25.101 and TS 34.121, all of which are publicly available. The diversity CDMA receive path does not need to be compliant with all of the CDMA system requirements. For example, the diversity CDMA receive path may be designed to operate over a smaller dynamic range, to have worse receiver sensitivity, and to be less effective at rejecting jammers than the main CDMA receive path. This non-compliant design allows the diversity CDMA receive path to be implemented with lower power consumption, less area, and lower cost. For example, LNA 234b may be operated with a higher gain and/or lower current than LNA 234a, even though this may degrade the linearity performance of LNA 234b. The diversity CDMA receive path can still provide good performance under most operating conditions.

When operating in a diversity mode, the main and diversity CDMA receive paths are both active and tuned to the same RF channel on the CDMA receive band. RF unit 250a processes the main and diversity CDMA received signals from the main and diversity CDMA receive paths, respectively, and provides main and diversity baseband received signals (C_RXM and C_RXD), respectively. A rake receiver (which is commonly used for CDMA) then processes and combines two data sample streams for these two baseband signals to obtain a composite received symbol stream having improved received signal quality, which may be quantified by an energy-per-bit-to-total-noise ratio (Eb/No). A higher Eb/No can provide improved performance (e.g., higher overall throughput) for high data rate applications such as CDMA 1X EV-DO, UMTS High Speed Packet Data, UMTS High Speed Circuit-Switched Data, and so on.

When operating in a non-diversity mode, the main and diversity CDMA receive paths may be independently tuned to different RF channels. For example, the main CDMA receive path may be tuned to an RF channel for a pending data call, and the diversity CDMA receive path may be tuned to another RF channel to monitor for paging messages or to search for pilots. If a paging message is received (e.g., for an incoming call), then the wireless device may (1) interrupt the pending data call and bring up a voice call (e.g., after user acceptance) using the main CDMA receive path or (2) process both the data and voice calls concurrently using the two CDMA receive paths.

Transceiver system 210a may be operated in various manners. In one operational mode, transceiver system 210a processes only GSM or CDMA at any given moment. In another operational mode, transceiver system 210a can process one CDMA receive path and one GSM receive path simultaneously. This capability may be used, e.g., to support handover between CDMA and GSM, to search for a CDMA 1x EV-DO system during a GSM call, and so on.

FIG. 2 shows a specific embodiment, and various modifications may be made. For example, it may be possible to combine signal paths for GSM and CDMA, depending on their frequency bands and modulation schemes.

For transceiver system 210a, main antenna 202 is used to both transmit and receive, whereas diversity antenna 204 is only used to receive. The first GSM receive path in first section 212a may be for a commonly used GSM band, and the second GSM receive path in second section 214a may be for a less commonly used GSM band. By using one GSM transmit path for both GSM bands and splitting the two GSM receive paths for the two GSM bands onto two antennas, the complexity of sections 212a and 214a is reduced. For example, first section 212a may utilize a SP3T switch, which is readily available and has good performance.

Figure 3:
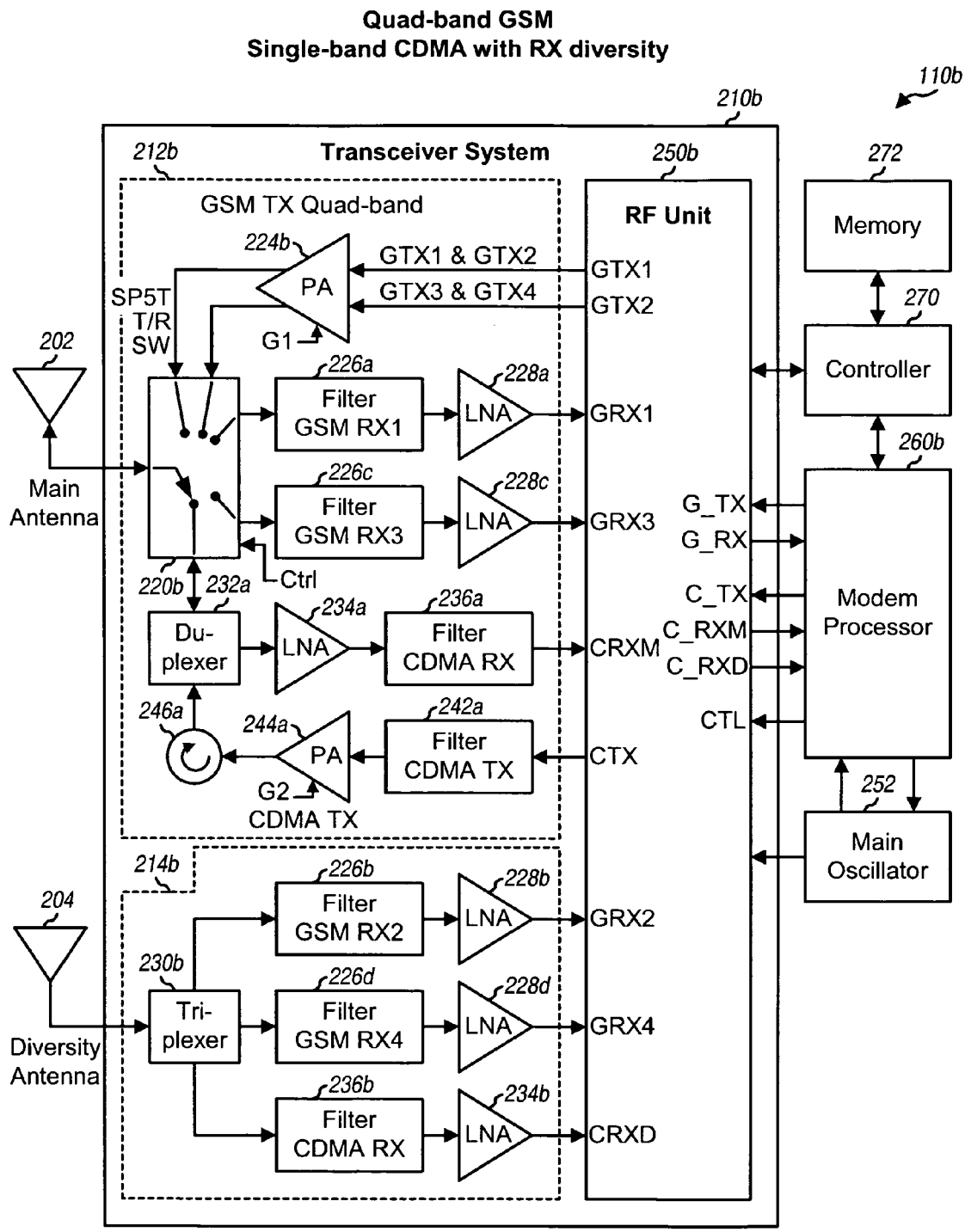
FIG. 3 shows a dual-antenna wireless device that supports four frequency bands for GSM and a single frequency band with RX diversity for CDMA.

FIG. 3 shows a block diagram of a dual-antenna wireless device 110b, which is another embodiment of wireless device 110. Wireless device 110b includes a transceiver system 210b that supports a single frequency band (e.g., PCS or cellular) with RX diversity for CDMA and four frequency bands (e.g., GSM1900, GSM1800, GSM900, and GSM850) for GSM. A quad-band GSM transceiver is able to communicate on all currently commonly used GSM bands and supports international roaming.

Transceiver system 210b includes a first section 212b, a second section 214b, and an RF unit 250b. First section 212b includes two GSM transmit paths for the four GSM bands, a first GSM receive path for the first GSM band, a third GSM receive path for the third GSM band, and a transmit path and a main receive path for CDMA. Second section 214b includes a second GSM receive path for the second GSM band, a fourth GSM receive path for the fourth GSM band, and a diversity receive path for CDMA. RF unit 250b conditions signals for sections 212b and 214b.

Within first section 212b, a single-pole five-throw (SP5T) T/R switch 220b has one common RF port coupled to main antenna 202 and five I/O RF ports coupled to the two GSM transmit paths, the first and third GSM receive paths, and duplexer 232a for the CDMA transmit/main receive paths. T/R switch 220b couples the common RF port to one of the five I/O RF ports at any given moment. T/R switch 220a performs switching to allow first section 212b to process either GSM or CDMA, and further performs switching between the transmit and receive paths for one GSM band when first section 212b is processing GSM.

The two GSM transmit paths include a quad-band power amplifier module 224b having two inputs and two outputs. PA module 224b can receive and amplify a first GSM transmit signal (GTX1) from RF unit 250b for either the first or second GSM band and provide a first GSM uplink signal for transmission via main antenna 202. PA module 224b can also receive and amplify a second GSM transmit signal (GTX2) from RF unit 250b for either the third or fourth GSM band and provide a second GSM uplink signal for transmission via main antenna 202. The first GSM receive path includes filter 226a and LNA 228a that perform filtering and amplification on the received signal from main antenna 202 and provide a first GSM received signal (GRX1) to RF unit 250b. The third GSM receive path includes a filter 226c and an LNA 228c that perform filtering and amplification on the received signal and provide a third GSM received signal (GRX3) to RF unit 250b. Filters 226a and 226c may be SAW filters having bandwidths equal to the first and third GSM receive bands, respectively.

Within second section 214b, a triplexer 230b couples to diversity antenna 204, obtains the received signal from antenna 204, provides first and second triplexer output signals to the second and fourth GSM receive paths, respectively, and provides a third triplexer output signal to the diversity CDMA receive path. The second GSM receive path includes a filter 226b and an LNA 228b that filter and amplify the first triplexer output signal and provide a second GSM received signal (GRX2) to RF unit 250b. The fourth GSM receive path includes a filter 226d and an LNA 228d that filter and amplify the second triplexer output signal and provide a fourth GSM received signal (GRX4) to RF unit 250b. Filters 226b and 226d may be SAW filters having bandwidths equal to the second and fourth GSM receive bands, respectively.

The CDMA transmit path and the main CDMA receive path in section 212b are the same as in section 212a in FIG. 2. The diversity CDMA receive path in section 214b is the same as in section 214a in FIG. 2.

Transceiver system 210b may be operated in various manners. Table 2 lists some operational modes supported by transceiver system 210b.

TABLE 2

| Operational Mode | Main Antenna | Diversity Antenna |
| --- | --- | --- |
| 1 | CDMA TX & RX | CDMA RX (diversity) |
| 2 | GSM TX1 & RX1 | not used |
| 3 | GSM TX3 & RX3 | not used |

TABLE 2-continued

| Operational Mode | Main Antenna | Diversity Antenna |
|---|---|---|
| 4 | GSM TX2 | GSM RX2 |
| 5 | GSM TX4 | GSM RX4 |
| 6 | CDMA TX & RX | CDMA RX (RF ch2) |
| 7 | CDMA TX & RX | GSM RX2 |
| 8 | CDMA TX & RX | GSM RX4 |
| 9 | GSM TX1 & RX1 | CDMA RX |
| 10 | GSM TX3 & RX3 | CDMA RX |

For transceiver system 210b, main antenna 202 is used to both transmit and receive, whereas diversity antenna 204 is only used to receive. The first and third GSM receive paths in first section 212b may be for two commonly used GSM bands, and the second and fourth GSM receive paths in second section 214b may be for two less commonly used GSM bands (e.g., for roaming). For example, first section 212b may cover GSM900 and GSM1900 and second section 214b may cover GSM850 and GSM1900 if wireless device 110b is intended for the European market. Alternatively, first section 212b may cover GSM850 and GSM1900 and second section 214b may cover GSM900 and GSM1900 if wireless device 110b is intended for the United States market. By using two GSM transmit paths for four GSM bands and by splitting the four GSM receive paths for the four GSM bands onto two antennas, the complexity of sections 212b and 214b is reduced. For example, first section 212b may utilize a SP5T switch, which is readily available and has good performance.

Figure 4:
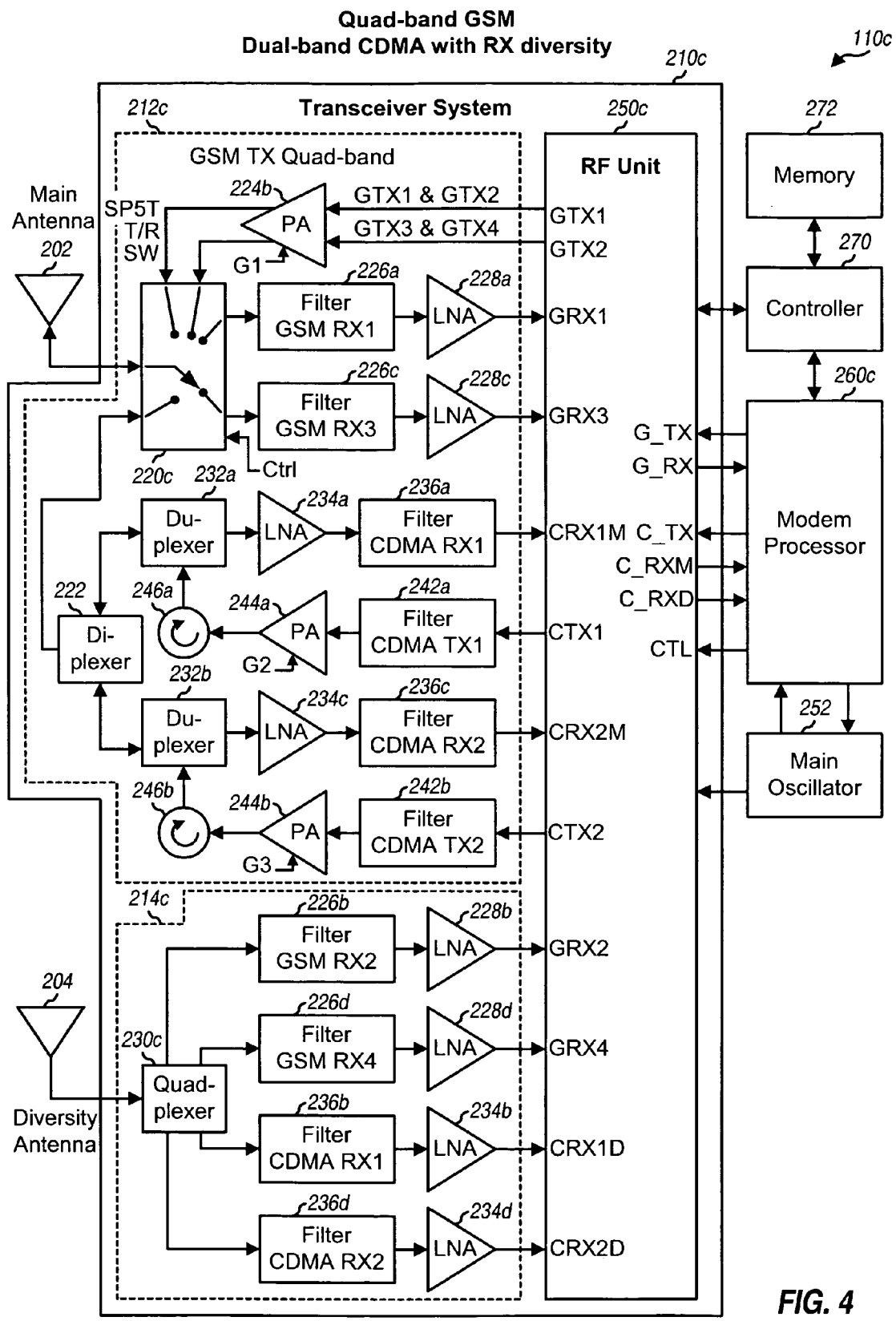
FIG. 4 shows a dual-antenna wireless device that supports four frequency bands for GSM and two frequency bands with RX diversity for CDMA.

FIG. 4 shows a block diagram of a dual-antenna wireless device 110c, which is yet another embodiment of wireless device 110. Wireless device 110c includes a transceiver system 210c that supports two frequency bands (e.g., PCS and cellular) with RX diversity for CDMA and four frequency bands (e.g., GSM1900, GSM1800, GSM900, and GSM850) for GSM. Transceiver system 210c includes a first section 212c, a second section 214c, and an RF unit 250c. First section 212c includes two GSM transmit paths for the four GSM bands, first and third GSM receive paths for two GSM bands, and two CDMA transmit paths and two main CDMA receive paths for the two CDMA bands. Second section 214c includes second and fourth GSM receive paths for the other two GSM bands and two diversity CDMA receive paths for the two CDMA bands. RF unit 250c conditions signals for sections 212c and 214c.

Within first section 212c, a SP5T T/R switch 220c has one common RF port coupled to main antenna 202 and five I/O RF ports coupled to the two GSM transmit paths, the first and third GSM receive paths, and a diplexer 222 for the CDMA transmit/main receive paths. The two GSM transmit paths and the first and third GSM receive paths in section 212c are the same as in section 212b in FIG. 3. The transmit path and the main receive path for the first CDMA band are implemented with duplexer 232a, LNA 234a, filters 236a and 242a, power amplifier 244a, and isolator 246a, as described above for FIG. 2. The transmit path and the main receive path for the second CDMA band are implemented with a duplexer 232b, an LNA 234c, filters 236c and 242b, a power amplifier 244b, and an isolator 246b, which are designed for the second CDMA band. Diplexer 222 couples to one I/O RF port of T/R switch 220c, one port of duplexer 232a, and one port of duplexer 232b. Diplexer 222 routes a first CDMA signal for the first CDMA band between T/R switch 220c and duplexer 232a and further routes a second CDMA signal for the second CDMA band between T/R switch 220c and duplexer 232b.

Within second section 214c, a quadplexer 230c couples to diversity antenna 204, the second and fourth GSM receive paths, and the two diversity CDMA receive paths. The second and fourth GSM receive paths and the first diversity CDMA receive path in section 214c are the same as in section 214b in FIG. 3. The second diversity CDMA receive path is implemented with a filter 236d and an LNA 234d, which are designed for the second CDMA band.

For transceiver system 210c, main antenna 202 is used to both transmit and receive, whereas diversity antenna 204 is only used to receive. SP5T switch 220c can support all GSM and CDMA transmit paths, two GSM receive paths, and two main CDMA receive paths in first section 212c. Quadplexer 230c can support two GSM receive paths and two diversity CDMA receive paths in second section 214c.

Figure 5:
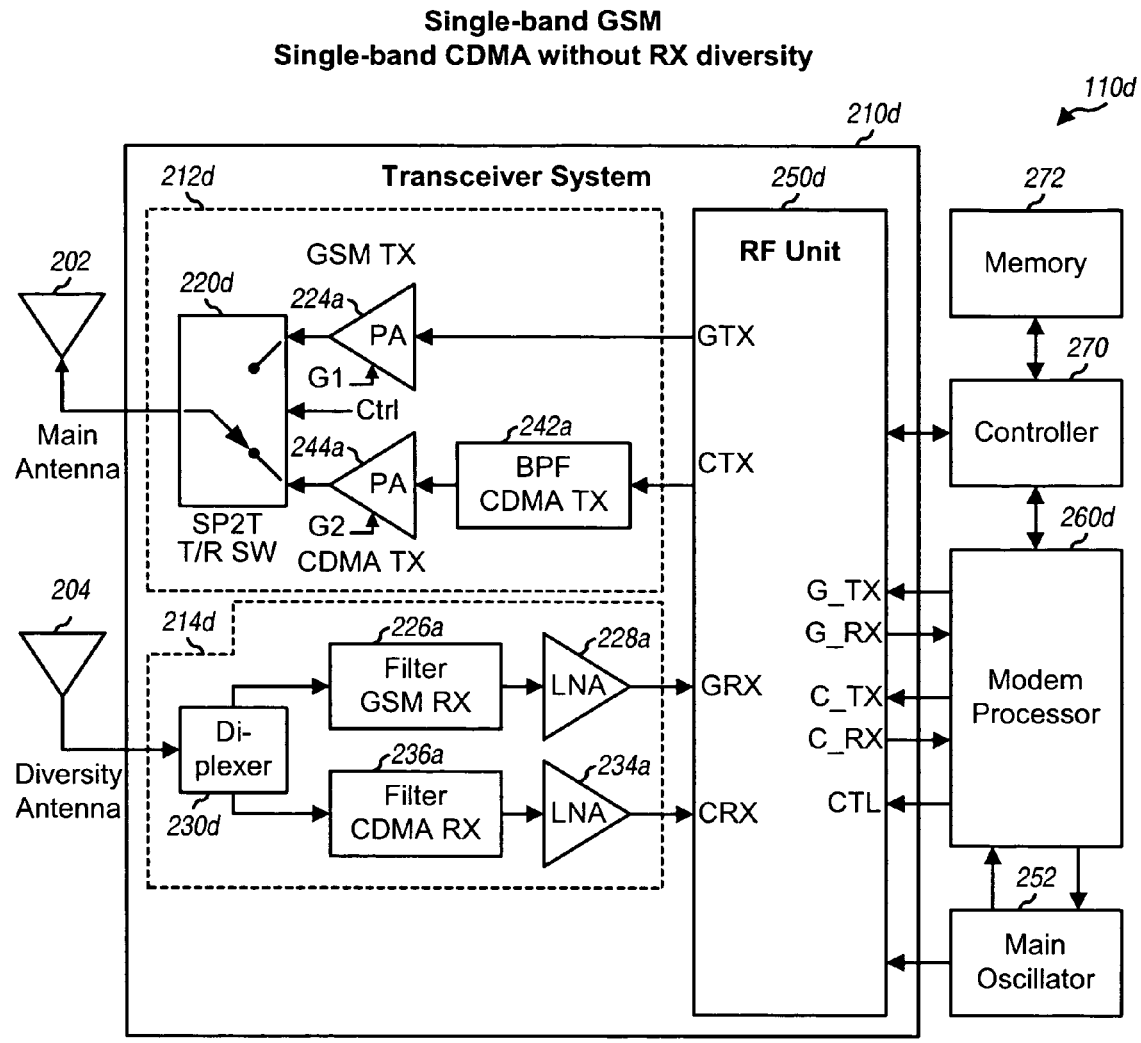
FIG. 5 shows a dual-antenna wireless device that supports a single frequency band for GSM and a single frequency band for CDMA.

FIG. 5 shows a block diagram of a dual-antenna wireless device 110d, which is yet another embodiment of wireless device 110. Wireless device 110d includes a transceiver system 210d that supports a single frequency band (e.g., PCS or cellular) for CDMA and a single frequency band (e.g., GSM1900, GSM1800, GSM900, or GSM850) for GSM. Transceiver system 210d includes a first section 212d, a second section 214d, and an RF unit 250d. First section 212d includes a GSM transmit path and a CDMA transmit path. Second section 214d includes a GSM receive path and a CDMA receive path. RF unit 250d conditions signals for sections 212d and 214d.

Within first section 212d, a single-pole two-throw (SP2T) T/R switch 220d has one common RF port coupled to main antenna 202 and two I/O RF ports coupled to the GSM transmit path and the CDMA transmit path. The GSM transmit path is the same as in section 212a in FIG. 2. The CDMA transmit path is implemented with filter 242a and power amplifier 244a and is as described above for FIG. 2. Within second section 214d, a diplexer 230d couples to diversity antenna 204 and to the GSM and CDMA receive paths. Diversity antenna 204 is used as a second antenna and not for diversity. The GSM receive path includes filter 226a and LNA 228a, and the CDMA receive path includes filter 236a and LNA 234a, as described above for FIG. 2. Diversity antenna 204 is designed to have 22 dB or more of isolation from main antenna 202 to prevent damage to the receiver circuitry in section 214d from the GSM Transmit bursts.

For transceiver system 210d, main antenna 202 is only used to transmit and diversity antenna 204 is only used to receive. SP2T switch 220d can support both GSM and CDMA transmit paths. Diplexer 230d can support both GSM and CDMA receive paths. Transceiver system 210d may be implemented with minimal circuitry.

Figure 6:
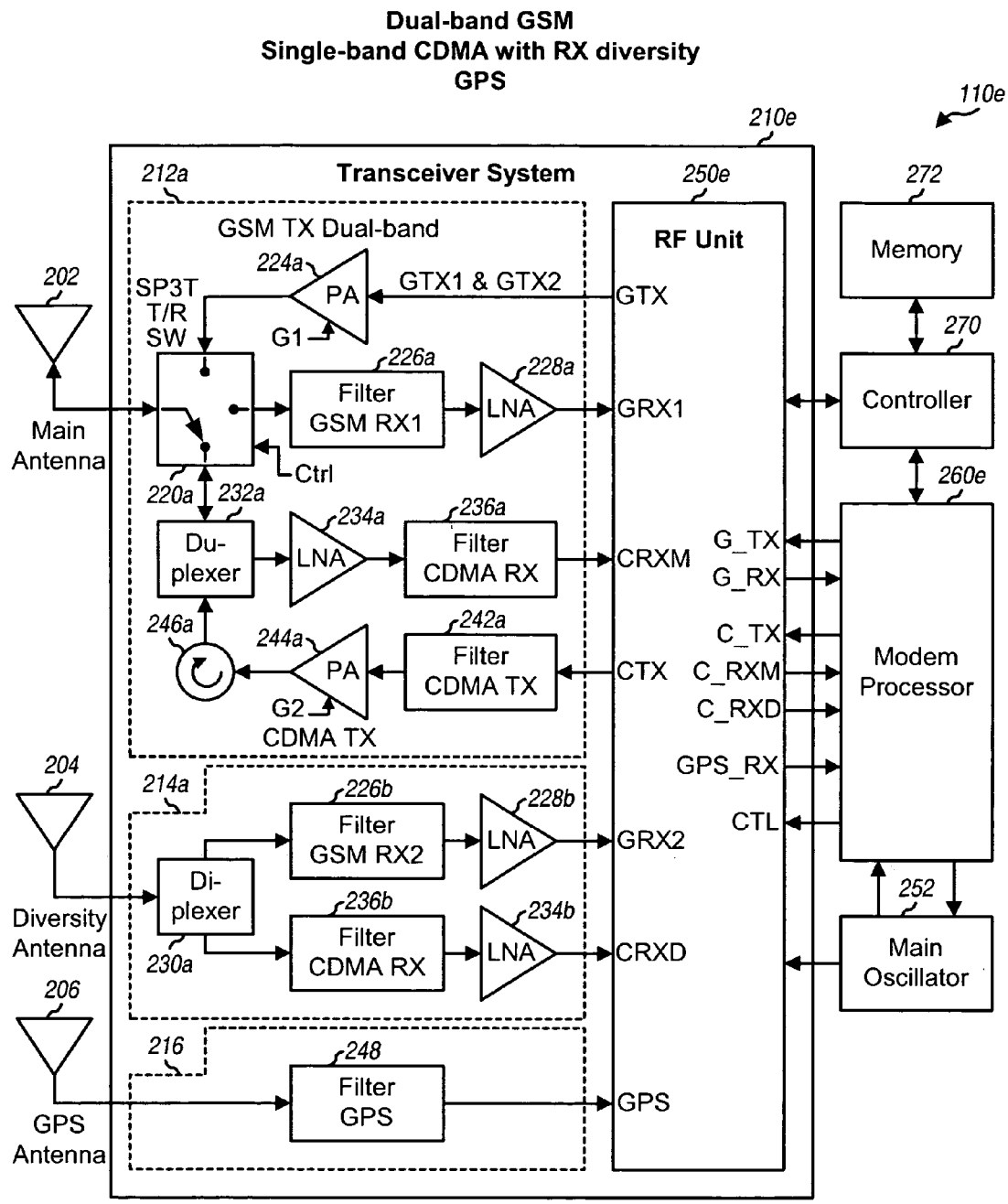
FIG. 6 shows a triple-antenna wireless device that supports two frequency bands for GSM, a single frequency band with RX diversity for CDMA, and GPS.

FIG. 6 shows a block diagram of a tri-antenna wireless device 110e, which is yet another embodiment of wireless device 110. Wireless device 110e includes a transceiver system 210e that supports a single frequency band (e.g., PCS or cellular) with RX diversity for CDMA, two frequency bands (e.g., GSM1900 and GSM850, or GSM1800 and GSM900) for GSM, and GPS. Transceiver system 210e includes sections 212a, 214a, and 216, and an RF unit 250e. Sections 212a and 214a are described above for FIG. 2. Within third section 216, a filter 248 couples to a third antenna 206 for GPS, filters a received signal from antenna 206, and provides a GPS received signal to RF unit 250e. Third antenna 206 may be designed for the GPS band. Filter 248 may be implemented with a SAW filter having a bandwidth equal to the GPS band.

RF unit 250e conditions GSM, CDMA, and GPS signals for sections 212a, 214a, and 216. RF unit 250e includes a GPS receiver that performs signal conditioning for the GPS received signal from filter 248. RF unit 250e may also include a VCO and a PLL for GPS, to allow for independent tuning of the GPS receiver.

In general, third antenna 206 and filter 248 may be implemented on any of the wireless devices described above in FIGS. 2 through 6 in order to provide GPS capability. For example, third antenna 206 and filter 248 may be implemented on wireless device 110b in FIG. 3. Such a wireless device would then be able to support a single CDMA band with RX diversity, four GSM bands, and GPS.

GPS may be used to obtain accurate worldwide three-dimensional (3-D) position information. GPS consists of 24 satellites in six 55° orbital planes. A GPS receiver has line-of-sight to at least four GPS satellites from any location on Earth unless blocked by objects (e.g., buildings, trees, mountains, and so on). The GPS receiver can obtain a 3-D position fix based on measurements for at least three GPS satellites or a 2-D position fix based on measurements for three GPS satellites. A position fix is an estimate of the location of the GPS receiver. The GPS receiver can determine a time of arrival (TOA) for each GPS satellite, which is a measure of the time it takes for the GPS signal to travel from the satellite to the receiver. The GPS receiver can then calculate the distance to each GPS satellite based on the TOA for the satellite. The GPS receiver can then triangulate its position on Earth based on accurate distances to three GPS satellites and the known locations of these satellites. Since the GPS receiver is typically not synchronized with the GPS satellites, an additional measurement for either a fourth GPS satellite or an Earth-bound base station is used to account for ambiguity in the timing of the GPS receiver.

A GPS-capable wireless device may obtain a position fix using a stand-alone mode or a network-assisted mode. In the stand-alone mode, the wireless device receives and processes GPS signals and computes the position fix. In the network-assisted mode, which is also called assisted GPS (AGPS), the wireless device obtains the position fix with assistance from a wireless system. The wireless device may obtain aiding information from the wireless system and use this information to search for GPS satellites, to download Ephemeris information from the GPS satellites, and so on. The Ephemeris information provides the locations of the GPS satellites. The wireless device may send measurements to the wireless system, which then computes the position fix for the wireless device.

The wireless device may implement a "cut-away" architecture or a simultaneous architecture for GPS. For the cut-away architecture, communication with a wireless system is (1) momentarily halted to allow the GPS receiver to tune to and obtain measurements and data from GPS satellites and (2) resumed thereafter. For the simultaneous architecture, the wireless device can receive and process GPS signals while simultaneously maintaining communication with the wireless system. This architecture supports real-time position-based services during a communication session. For example, a wireless user can access real-time position-based information such as maps, directions, store locations, and so on.

The transceiver architecture described herein allows a simpler T/R switch with fewer I/O RF ports to be used to support multiple GSM and CDMA bands. For example, transmitter system 210c in FIG. 4 uses a SP5T T/R switch to support four GSM bands and two CDMA bands with two antennas. A conventional transceiver system would need a larger T/R switch with eight or nine I/O RF ports to support all of these GSM and CDMA bands with a single antenna. The larger T/R switch would likely have higher insertion loss, worse linearity performance, and so on. The higher insertion loss may result in worse receiver sensitivity, higher output power for the power amplifier, higher power consumption, shorter talk-time, hotter operating temperature, and so on, in comparison to a GSM-only or a CDMA-only wireless device. In contrast, transmitter system 210c uses a smaller, lower-loss, and lower-cost SP5T T/R switch, which ameliorates most of the disadvantages and adverse effects described above for the brute-force transceiver system. The simpler T/R switch can provide better linearity performance, which is needed for CDMA in order to prevent (1) cross-modulation products that fall in the CDMA receive band and (2) spectral regrowth in the CDMA transmit band. The simpler T/R switch may thus provide better performance for both CDMA and GSM.

Figure 7A:
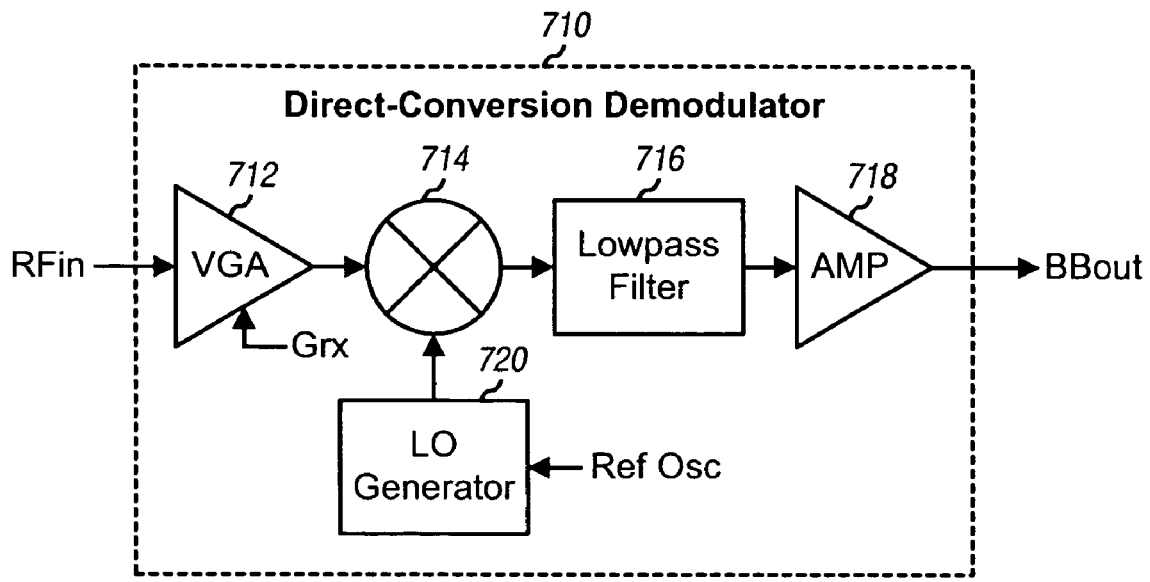
FIG. 7A shows a demodulator that utilizes a direct-conversion architecture.

FIG. 7A shows a block diagram of a demodulator 710, which utilizes the direct-conversion architecture and may be implemented within the RF units shown in FIGS. 2 through 6. Demodulator 710 receives and processes an RF received signal (Rfin) and provides a baseband output signal (BBout). For transceiver system 210a in FIG. 2, the RF received signal may correspond to the first GSM received signal (GRX1), the second GSM received signal (GRX2), the main CDMA received signal (CRXM), or the diversity CDMA received signal (CRXD). The baseband output signal (BBout) may correspond to a GSM baseband receive signal (G_RX), a main CDMA baseband receive signal (C_RXM), or a diversity CDMA baseband receive signal (C_RXD).

Within demodulator 710, a variable gain amplifier (VGA) 712 amplifies the RF received signal (RFin) with a variable gain (Grx) and provides a conditioned signal having the desired signal level. A mixer 714 demodulates the conditioned signal with a receive LO signal from an LO generator 720 and provides a downconverted signal. LO generator 720 may include (1) a VCO that generates the receive LO signal and (2) a PLL that adjusts the frequency of the receive LO signal such that the signal component in the RF channel of interest is downconverted to baseband or near-baseband. A lowpass filter 716 filters the downconverted signal to pass the signal components in the RF channel of interest and to remove noise and undesired signals that may be generated by the downconversion process. Lowpass filter 716 may be implemented with various filter types (e.g., Butterworth, elliptical, Chebychev, and so on) and with the proper filter order and bandwidth. An amplifier (AMP) 718 amplifies and buffers the lowpass filtered signal and provides the baseband output signal (BBout).

Figure 7B:
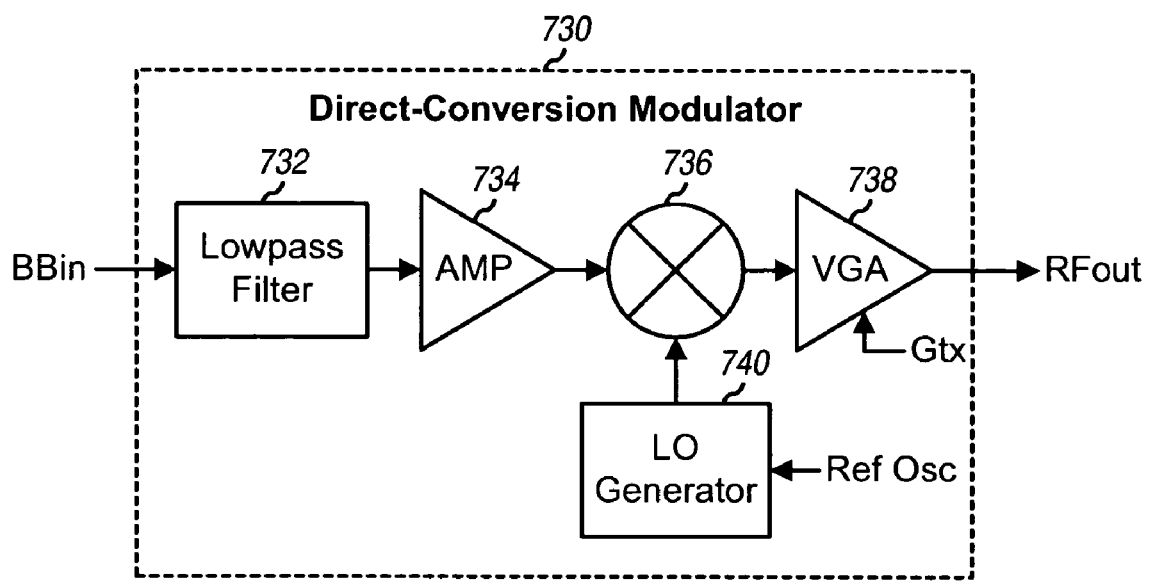
FIG. 7B shows a modulator that utilizes the direct-conversion architecture.

FIG. 7B shows a block diagram of a modulator 730, which utilizes the direct-conversion architecture and may also be implemented within the RF units shown in FIGS. 2 through 6. Modulator 730 receives and processes a baseband input signal (BBin) and provides an RF transmit signal (RFout). For transceiver system 210a in FIG. 2, the baseband input signal may correspond to a GSM baseband transmit signal (G_TX) or a CDMA baseband transmit signal (C_TX). The RF transmit signal may correspond to the GSM transmit signal (GTX) or the CDMA transmit signal (CTX).

Within modulator 730, a lowpass filter 732 filters the baseband input signal (BBin) to remove undesired images generated by the digital-to-analog conversion and provides a filtered baseband signal. An amplifier 734 then amplifies and buffers the filtered baseband signal and provides an amplified baseband signal. A mixer 736 modulates the amplified baseband signal with a transmit LO signal from an LO generator 740 and provides an upconverted signal. LO generator 740 may include a VCO and a PLL that can generate the transmit LO signal at the desired transmit frequency. A VGA 738 amplifies the upconverted signal with a variable gain (Gtx) and provides the RF transmit signal (RFout).

FIGS. 7A and 7B show specific embodiments of demodulator 710 and modulator 730, respectively. In general, a demodulator may include one or more stages of amplifier, filter, mixer, and so on, which may be arranged differently from the embodiment shown in FIG. 7A. Similarly, a modulator may include one or more stages of amplifier, filter, mixer, and so on, which may also be arranged differently from the embodiment shown in FIG. 7B. Each of the RF units shown in FIGS. 2 through 6 may include multiple modulators 730 for the GSM and CDMA transmit paths, and multiple demodulators 710 for the GSM and CDMA receive paths. The demodulator and modulator may also utilize the superheterodyne architecture, as is known in the art.

For clarity, various specific embodiments of the transceiver system have been described for CDMA, GSM, and GPS. The transceiver system uses a transceiver architecture that couples some of the signal paths to the main antenna and the remaining signal paths to the diversity antenna. This transceiver architecture reduces the complexity of the transceiver system and improves performance. Other embodiments of the transceiver system may also be designed based on the description provided herein.

The transceiver system described herein may be used for a wireless device and a base station. The transceiver system may also be used for various wireless systems such as CDMA systems, TDMA systems (e.g., a GSM system), an AMPS system, a multiple-input multiple-output (MIMO) system, an orthogonal frequency division multiplexing (OFDM)-based wireless system, a wireless local area network (WLAN), and so on.

The transceiver system may be implemented on one or more RFICs and/or with discrete components. The filters used for the transmit and receive paths are typically SAW filters, which are normally discrete components. The LNAs, power amplifiers, and circuitry within the RF units may be implemented on one or more RFICs. The RFICs may be fabricated with various IC process technologies such as complementary metal oxide semiconductor (CMOS), bipolar junction transistor (BJT), bipolar-CMOS (BiCMOS), silicon germanium (SiGe), gallium arsenide (GaAs), and so on.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device comprising:
a first section coupled to a first antenna and comprising a first transmit path and a first receive path for a first wireless system and further comprising a first transmit path and a first receive path for a second wireless system, said first section for transmitting and receiving a first TDMA frequency band and for transmitting a second TDMA frequency band using the first antenna; and
a second section coupled to a second antenna and comprising a second receive path for the first wireless system and a second receive path for the second wireless system, wherein the second receive path for the first wireless system is for receiving the second TDMA frequency band using the second antenna, and wherein the first and second receive paths for the second wireless system are for a single frequency band and the second TDMA frequency band is transmitted and received on different ones of the first and second antennas.

2. The wireless device of claim 1, wherein each transmit path comprises a power amplifier (PA).

3. The wireless device of claim 1, wherein each receive path comprises a filter and a low noise amplifier (LNA).

4. The wireless device of claim 1, wherein the first section further comprises a duplexer coupled to the first transmit path and the first receive path for the second wireless system.

5. The wireless device of claim 4, wherein the first section further comprises a transmit/receive (T/R) switch coupled to the first antenna, the first transmit path for the first wireless system, the first receive path for the first wireless system, and the duplexer.

6. The wireless device of claim 5, wherein the T/R switch is a single-pole three-throw (SP3T) switch.

7. The wireless device of claim 1, wherein the first receive path for the second wireless system is compliant with performance requirements of the second wireless system, and wherein the second receive path for the second wireless system is non-compliant with at least one of the performance requirements.

8. The wireless device of claim 1, wherein the second antenna is isolated from the first antenna by at least 22 decibels (dB).

9. The wireless device of claim 1, further comprising:
a radio frequency (RF) unit coupled to the first and second sections and operable to perform signal conditioning for RF transmit signals for the first transmit paths for the first and second wireless systems and to further perform signal conditioning for RF received signals from the first and second receive paths for the first and second wireless systems.

10. The wireless device of claim 9, wherein the RF unit is operable to perform modulation and frequency upconversion on baseband transmit signals to obtain the RF transmit signals, and to perform frequency downconversion and demodulation on the RF received signals to obtain baseband received signals.

11. The wireless device of claim 10, wherein the RF unit performs modulation and frequency upconversion utilizing direct-conversion from baseband directly up to RF.

12. The wireless device of claim 10, wherein the RF unit performs frequency downconversion and demodulation utilizing direct-conversion from RF directly down to baseband.

13. The wireless device of claim 1, wherein the first section further comprises a third receive path for the first wireless system, wherein the second section further comprises a fourth receive path for the first wireless system, and wherein the first, second, third, and fourth receive paths for the first wireless system are for four frequency bands.

14. The wireless device of claim 13, wherein the first and second receive paths for the first wireless system are for two commonly used frequency bands, and wherein the third and fourth receive paths for the first wireless system are for two less commonly used frequency bands.

15. The wireless device of claim 13, wherein the first section further comprises a second transmit path for the first wireless system, and wherein each of the first and second transmit paths for the first wireless system covers two of the four frequency bands.

16. The wireless device of claim 1, wherein the first section further comprises a second transmit path and a third receive path for the second wireless system, wherein the second section further comprises a fourth receive path for the second wireless system, and wherein the second transmit path and the third and fourth receive paths for the second wireless system are for a second frequency band of the second wireless system.

17. The wireless device of claim 1, wherein the first section further comprises a second transmit path and a third receive path for the first wireless system and a second transmit path and a third receive path for the second wireless system, wherein the second section further comprises a fourth receive path for the first wireless system and a fourth receive path for the second wireless system, wherein the first, second, third, and fourth receive paths for the first wireless system are for four frequency bands, and wherein the third and fourth receive paths for the second wireless system are for a second frequency band of the second wireless system.

18. The wireless device of claim 1, wherein the first wireless system is a Time Division Multiple Access (TDMA) system, and wherein the second wireless system is a Code Division Multiple Access (CDMA) system.

19. The wireless device of claim 18, wherein the first wireless system is a Global System for Mobile Communications (GSM) system.

20. The wireless device of claim 1, further comprising:
a third section coupled to a third antenna and comprising a receive path for a satellite positioning system.

21. The wireless device of claim 20, wherein the satellite positioning system is Global Positioning System (GPS).

22. A device adapted to perform conditioning of signals communicated by way of a first antenna and to perform conditioning of signals received by way of a second antennas, said device adapted to communicate through wireless communication components, said components comprising:
a first section coupled to the first antenna and comprising a first transmit path and a first receive path for a first wireless system and further comprising a first transmit path and a first receive path for a second wireless system, said first section for transmitting and receiving a first TDMA frequency band and for transmitting a second TDMA frequency band using the first antenna; and
a second section coupled to the second antenna and comprising a second receive path for the first wireless system and a second receive path for the second wireless system, wherein the second receive path for the first wireless system is for receiving the second TDMA frequency band using the second antenna, and wherein the first and second receive paths for the second wireless system are for a single frequency band and the second TDMA frequency band is transmitted and received on different ones of the first and second antennas.

23. The device of claim 22 wherein the first section of said components further comprises:
a duplexer coupled to the first transmit path and the first receive path for the second wireless system; and
a transmit/receiver (T/R) switch coupled to the first antenna, the first transmit path for the first wireless system, the first receive path for the first wireless system, and the duplexer.

24. The device of claim 22 wherein the at least two TDMA bands are GSM bands.

25. An apparatus comprising:
means for performing signal conditioning for a transmit path and a first receive path for a first wireless system, the transmit path for transmitting a first TDMA frequency band and for transmitting a second TDMA frequency band using a first antenna and the first receive path for receiving the first TDMA frequency band;
means for performing signal conditioning for a transmit path and a first receive path for a second wireless system;
means for coupling the transmit path and the first receive path for the first wireless system and the transmit path and the first receive path for the second wireless system to the first antenna;
means for performing signal conditioning for a second receive path for the first wireless system, wherein the second receive path for the first wireless system is for receiving the second TDMA frequency band using a second antenna;
means for performing signal conditioning for a second receive path for the second wireless system; and
means for coupling the second receive path for the first wireless system and the second receive path for the second wireless system to the second antenna, and wherein the first and second receive paths for the second wireless system are for a single frequency band and the second TDMA frequency band is transmitted and received on different ones of the first and second antennas.

26. The apparatus of claim 25, wherein the first wireless system is a Time Division Multiple Access (TDMA) system, and wherein the second wireless system is a Code Division Multiple Access (CDMA) system.

27. A wireless device comprising:
a first section coupled to a first antenna and comprising a first transmit path and a first receive path for a first wireless system and a second transmit path for a second wireless system, wherein the first antenna is used for transmitting data to the first and second wireless systems, said first section for transmitting and receiving a first TDMA frequency band and for transmitting a second TDMA frequency band using the first antenna; and
a second section coupled to a second antenna and comprising a second receive path for the first wireless system and a second receive path for the second wireless system, wherein the second receive path for the first wireless system is for receiving the second TDMA frequency band using the second antenna and the second TDMA frequency band is transmitted and received on different ones of the first and second antennas.

28. A method of operating a wireless device, comprising:
coupling, via a transmit/receive (T/R) switch, a transmit path for transmitting a first TDMA frequency band and for transmitting a second TDMA frequency band using the first antenna for a first wireless system, a first receive path for the first wireless system for receiving the first TDMA frequency band, or both a transmit path and a first receive path for a second wireless system to a first antenna; and
coupling a second receive path for the first wireless system and a second receive path for the second wireless system to a second antenna, and
wherein the second receive path for the first wireless system is for receiving the second TDMA frequency band using the second antenna, and wherein the first and second receive paths for the second wireless system are for a single frequency band and the second TDMA frequency band is transmitted and received on different ones of the first and second antennas.

* * * * *

UNITED STATES PATENT AND TRADEMARK OFFICE
CERTIFICATE OF CORRECTION

PATENT NO. : 7,643,848 B2 Page 1 of 1
APPLICATION NO. : 10/823344
DATED : January 5, 2010
INVENTOR(S) : Robert Lloyd Robinett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 238 days.

Signed and Sealed this

Twenty-first Day of December, 2010

David J. Kappos
*Director of the United States Patent and Trademark Office*